United States Patent [19]
Oka et al.

[11] Patent Number: 5,689,388
[45] Date of Patent: *Nov. 18, 1997

[54] REDUCED-HEIGHT MAGNETIC DISK DRIVE UNIT, AND DISK MOUNTING DEVICE FOR THE UNIT

[75] Inventors: Hiroshi Oka; Takeshi Shiga, both of Chichibu; Shigeki Koizumi, Chichibu-gun, all of Japan

[73] Assignee: Canon Denshi Kabushiki Kaisha, Saitama, Japan

[*] Notice: The term of this patent shall not extend beyond the expiration date of Pat. No. 5,461,523.

[21] Appl. No.: 180,509

[22] Filed: Jan. 12, 1994

Related U.S. Application Data

[63] Continuation of Ser. No. 921,438, Jul. 31, 1992, abandoned, which is a continuation of Ser. No. 536,345, Jun. 11, 1990, abandoned.

[30] Foreign Application Priority Data

Jun. 15, 1989 [JP] Japan .................... 1-150455
Jul. 18, 1989 [JP] Japan .................... 1-183750
Jul. 28, 1989 [JP] Japan .................... 1-194240

[51] Int. Cl.⁶ ............ G11B 17/03; G11B 19/20; G11B 33/12
[52] U.S. Cl. ............ 360/99.12; 360/99.08; 360/99.05; 360/99.04; 369/270; 369/271
[58] Field of Search ............ 360/99.12, 99.05, 360/98.08, 97.01, 99.04, 99.08, 99.09, 99.11, 98.07; 310/268; 369/270, 271, 260, 261

[56] References Cited

U.S. PATENT DOCUMENTS

| | | | |
|---|---|---|---|
| 3,891,796 | 6/1975 | Takahara et al. | 360/99.05 |
| 4,445,155 | 4/1984 | Takahashi et al. | 360/99.05 |
| 4,581,667 | 4/1986 | Gerfast | 360/99.12 |
| 4,654,725 | 3/1987 | Wakaizumi | 360/99.08 |
| 4,654,733 | 3/1987 | Kawakami et al. | 360/99.05 |
| 4,680,655 | 7/1987 | Sugawara | 369/270 |
| 4,688,125 | 8/1987 | Nomoto et al. | 360/99.02 |
| 4,788,464 | 11/1988 | Nishikawa et al. | 310/268 |
| 4,805,054 | 2/1989 | Kamoto et al. | 360/99.08 |
| 4,855,850 | 8/1989 | Nagaoka et al. | 360/99.12 |
| 4,874,976 | 10/1989 | Ohsawa et al. | 360/97.01 |
| 4,899,244 | 2/1990 | Morse | 360/99.12 |
| 4,965,476 | 10/1990 | Lin | 360/99.11 |
| 4,989,107 | 1/1991 | Tsukahara | 360/99.08 |
| 5,128,818 | 7/1992 | Koizumi et al. | 360/99.12 |
| 5,461,523 | 10/1995 | Hoshi | 360/99.08 |

FOREIGN PATENT DOCUMENTS

| | | | |
|---|---|---|---|
| 63-281267 | 11/1988 | Japan | 360/99.12 |
| 2-050349 | 2/1990 | Japan | 369/258 |
| 2-094167 | 4/1990 | Japan | 369/258 |

*Primary Examiner*—Craig A. Renner
*Attorney, Agent, or Firm*—Spencer & Frank

[57] ABSTRACT

A disk mounting device, in a disk drive unit for rotating a disk-shaped recording medium while writing information on and/or reading information from it, includes an attracting magnet to magnetically hold the recording medium. The attracting magnet is mounted directly on the rotor yoke of a disk drive motor. With this arrangement, the height of the disk mounting device, as well as the height of the disk drive unit incorporating the disk mounting device, can be reduced.

23 Claims, 4 Drawing Sheets

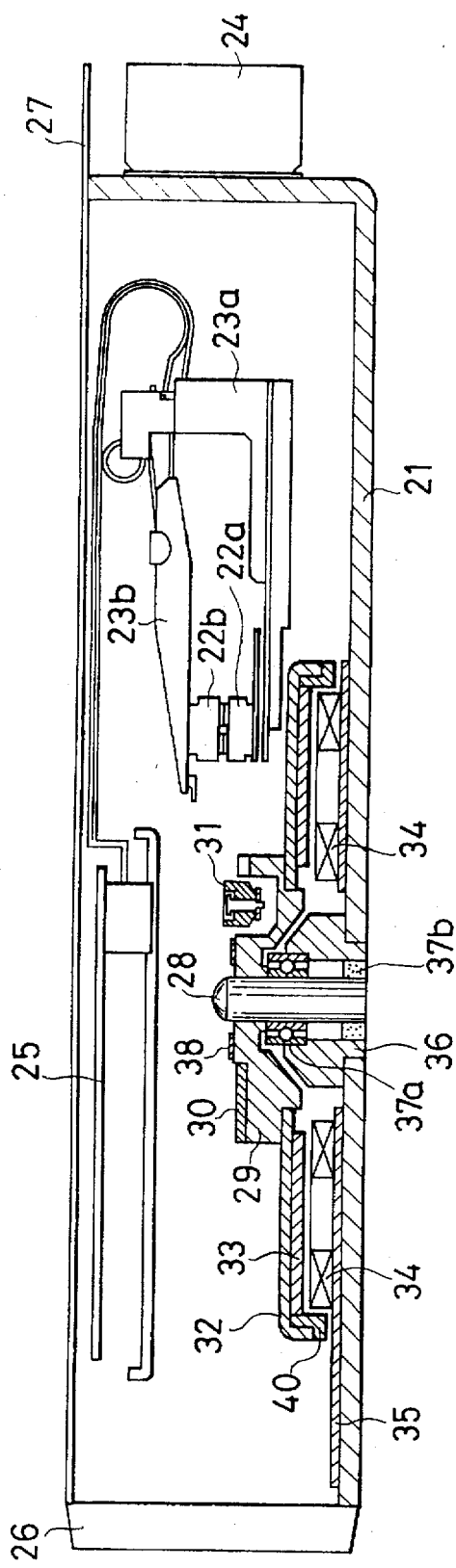
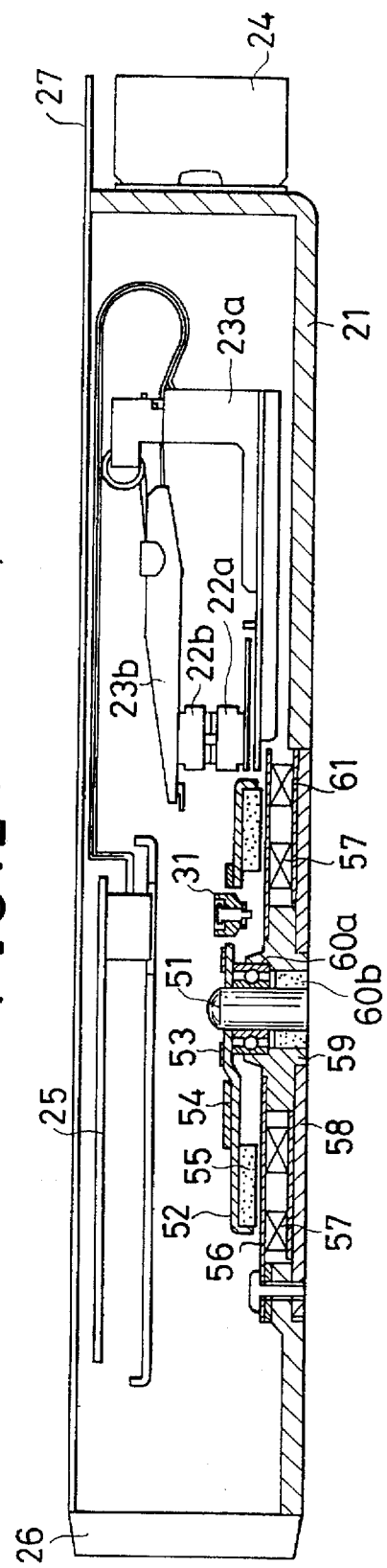
FIG. 2 (PRIOR ART)
FIG. 6

REDUCED-HEIGHT MAGNETIC DISK DRIVE UNIT, AND DISK MOUNTING DEVICE FOR THE UNIT

This application is a continuation of application Ser. No. 07/921,438, filed Jul. 31, 1992, now abandoned, which was a continuation of application Ser. No. 07/536,345, filed Jun. 11, 1990, now abandoned.

BACKGROUND OF THE INVENTION

1. Field of the Invention

This invention relates to a disk mounting device for driving a disk (recording medium) in a recording/reproducing device, and also to a magnetic disk drive unit provided with such a disk mounting device.

2. Description of the Prior Art

FIG. 1 is a vertical cross-sectional view of a conventional disk mounting device. In FIG. 1, reference numeral 1 denotes a spindle or shaft, reference numeral 2 a magnet, reference numeral 3 a coil, reference numeral 4 a rotor yoke, reference numeral 5 a drive pin, reference numeral 6 a drive pin arm, reference numeral 9 a Teflon (polytetrafluoroethylene) tape, reference numeral 10 an attracting magnet, reference numeral 11 a stator, reference numeral 12 a printed circuit board, reference numeral 13 a bearing, reference numeral 14 a slide bearing, reference numeral 15 a chucking flange, and reference numeral 16 a rotor yoke-clamping screw.

In the conventional disk mounting device, the chucking flange 15 is provided as shown in FIG. 1, and the attracting magnet 10 is affixed to the upper surface of the chucking flange 15, so that the chucking flange 15 serves as a yoke for the attracting magnet 10. The spindle 1 is rotated, together with the rotor yoke 4, by an electromagnetic system, that is, a disk drive motor constituted by the magnet 2 and the coil 3.

In the above conventional disk mounting device, the disk drive motor and the chucking flange overlap each other in the direction of the thickness of the device, which results in the problem that the overall thickness of the disk drive unit is increased. Another problem is that, because of the use of the two component parts, that is, the disk drive motor and the chucking flange, the cost is high. Further, since the chucking flange is press-fitted on the spindle, which is made of stainless steel, the chucking flange must be made of aluminum, brass or the like. Therefore, the chucking flange does not function adequately as a yoke for the attracting magnet.

FIG. 2 is a front-elevational view, partially in section, of a conventional magnetic disk drive unit for driving a 3.5-inch floppy disk (magnetic recording medium), the magnetic disk drive unit incorporating a disk mounting device similar to the disk mounting device of FIG. 1.

Magnetic heads 22a and 22b for writing and reading information relative to recording surfaces on the opposite sides of a floppy disk are provided in a body or chassis 21 formed by pressing or aluminum-die casting. Head carriages 23a and 23b support the magnetic heads 22a and 22b so as to seek tracks on the recording surfaces of the floppy disk. The head carriages 23a and 23b are driven by a stepping motor 24.

A printed circuit board 25, incorporating a detection circuit, a control circuit, a drive circuit, and so forth, is provided at an upper portion of the chassis 21 so as to control the stepping motor 24 and other parts. Provided on one side of the chassis 21 is a panel 26 having a disk insertion/removal opening, display lamps indicating operation, etc. A cover 27 is attached to the top of the chassis 21 to prevent dust from intruding into the chassis 21 from the exterior.

A direct drive spindle motor (hereinafter referred to as a "DD motor") is provided for rotating the floppy disk after it has been loaded into the magnetic disk drive unit.

The DD motor comprises a shaft 28 which also serves to effect the centering of the floppy disk, a disk-shaped flange 29 fixedly mounted on the shaft 28 for rotation therewith (the loaded floppy disk is placed on this flange), an attracting magnet 30 mounted on the flange 29 so as to magnetically attract and hold the metal center hub of the loaded floppy disk, a drive pin 31 mounted on the flange 29 so as to be engaged with the floppy disk to drive the floppy disk for rotation, (drive pin 31 is supported by urging means, not shown, such as leaf springs or the like), a disk-shaped rotor 32 fixedly secured to the lower portion of the flange 29 in concentric relation to the flange 29 so as to rotate together with the flange 29, a drive magnet 33 (rotor element) secured to the lower surface of the rotor 32, a drive coil 34 (stator) fixed relative to the chassis 21 in opposed relation to the drive magnet 33, a printed circuit board 35 of iron fixedly holding the drive coil 34 and incorporating an FG pattern which will be described later, a motor housing 36, bearings 37a and 37b mounted at the central portion of the motor housing 35 and rotatably supporting the shaft 28, and a slide washer 38 mounted on the flange 29 and disposed inwardly of the attracting magnet 30.

The flange 29 may be formed by machining extruded aluminum, and the attracting magnet 30 may comprise a plastic magnet.

In order to detect the speed of rotation of the rotor element, an FG (function generator) magnet 40 is mounted on the lower side of the rotor 32 adjacent to the outer periphery of the rotor 32. The FG pattern is formed on the printed circuit board 35 opposite the FG magnet 40.

In the above construction, when the floppy disk is inserted through the panel 26 in a predetermined manner, and is further pushed against an outwardly-urging force, the floppy disk is automatically positioned on the flange 29. Then, when the DD motor is energized, that is, when electric current of a predetermined energizing phase is supplied to the drive coil 34, an attractive force or a repulsive force is produced due to the magnetomotive force of the drive coil 34 and the magnetic force of the drive magnet 33, thereby imparting a rotational force to the rotor 32.

The shaft 28 and the drive pin 31 rotate together with the rotor 32, and during one rotation, the drive pin 31 slides moves relative to the center hub provided at the central portion of the floppy disk until it fits in a slot formed in the center hub. Thereafter, the floppy disk rotates in response to the rotation of the drive pin 31. Also, during the rotation of the floppy disk, the magnetic heads 22a and 22b are moved radially with respect to the floppy disk in accordance with write signals or read signals, and are positioned on a selected track to effect the reading or the writing of data.

However, with respect to the conventional magnetic disk drive unit of FIG. 2, in the disk mounting device, the disk drive motor and the chucking flange overlap each other in the direction of the thickness of the device with the result that the overall thickness of the disk drive unit is increased. In addition, since the motor portion (rotor portion) and the magnetic heads are positioned adjacent to each other in the direction of the height of the magnetic disk drive unit, the overall height of the disk drive unit can be reduced by only a limited amount, thus failing to provide a satisfactorily thin-type of disk drive unit.

SUMMARY OF THE INVENTION

It is therefore a first object of this invention to provide a disk mounting device which is reduced in overall thickness, and has a smaller number of component parts, and requires less time and labor for assembling the device.

A second object of the invention is to provide a magnetic disk drive unit incorporating the above disk mounting device, which unit is reduced in overall thickness.

In order to achieve the first object, according to one aspect of the present invention, there is provided a disk mounting device in a drive mechanism in a unit for writing and reading information relative to a disk-shaped recording medium, comprising:

a disk drive motor for driving the recording medium for rotation, the disk drive motor having a rotor yoke; and an attracting magnet for magnetically holding the recording medium, the attracting magnet being mounted directly on the rotor yoke.

The attracting magnet can be made of a flexible rubber-type material.

According to one example, the attracting magnet and a tape of polytetrafluoroethylene are affixed directly to the rotor yoke, and there is provided chucking means for transmitting rotation of the disk drive motor to the recording medium. The chucking means includes a drive pin engageable with the floppy disk, and a drive pin arm connecting the drive pin to a rotatable motor shaft of the disk drive motor.

The disk drive motor can be a direct drive spindle motor which includes a rotor portion and a stator portion having an electromagnetic coil, the rotor portion having the rotor yoke and a drive magnet.

In order to achieve the second object, according to another aspect of the present invention, there is provided a magnetic disk drive unit having a magnetic head for writing and reading information relative to a disk-shaped recording medium, comprising:

(a) a disk mounting device comprising (i) a disk drive motor for driving the recording medium for rotation, the disk drive motor having a rotor yoke, the disk drive motor being in the form of a direct drive spindle motor which includes a rotor portion and a stator portion having an electromagnetic coil, and said rotor portion having said rotor yoke and a drive magnet; and (ii) an attracting magnet for magnetically holding the recording medium, the attracting magnet being mounted directly on the rotor yoke; and (b) a chassis on which the disk mounting device is fixedly mounted, part of the chassis being removed to provide a notched portion, the stator portion being disposed in the notched portion so that the rotor portion is disposed generally at the same level as the magnetic head and is disposed out of registry with the magnetic head in the direction of the height of the magnetic disk drive unit.

The drive magnet of the rotor portion can be made of a magnet of a rare earth element.

According to one example, the disk drive motor has a rotatable motor shaft and a bearing rotatably supporting the motor shaft. The stator also serves as means for supporting the bearing. The rotor portion to which the attracting magnet and the drive magnet are secured is disposed above the stator portion, and the rotor portion is mounted directly on the motor shaft.

BRIEF DESCRIPTION OF THE DRAWINGS

FIG. 2 is a front-elevational view, partially in section, of a conventional magnetic disk drive unit;

FIG. 6 is a front-elevational view partially in section, of a magnetic disk drive unit in accordance with the present invention.

DETAILED DESCRIPTION OF THE PREFERRED EMBODIMENTS

Figure 3A:
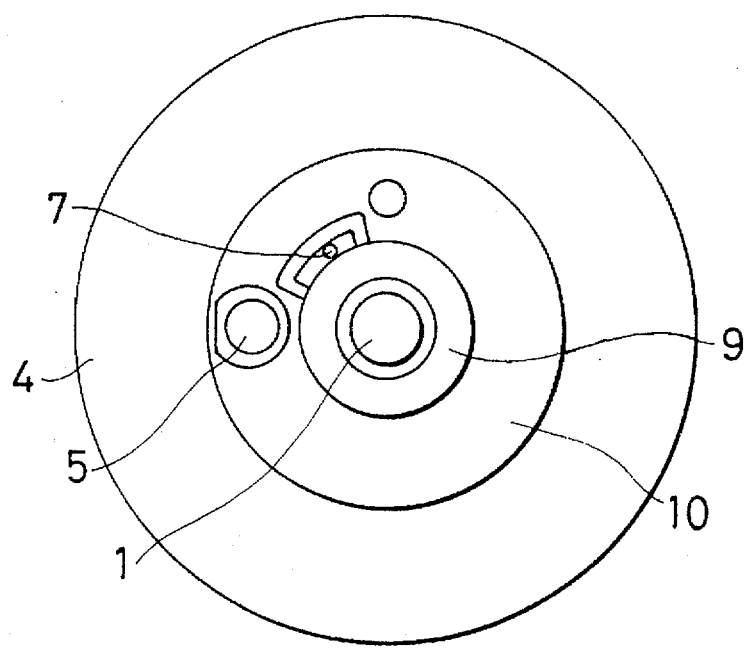
FIG. 3A is a plan view of a disk mounting device in accordance with the present invention.
Figure 3B:
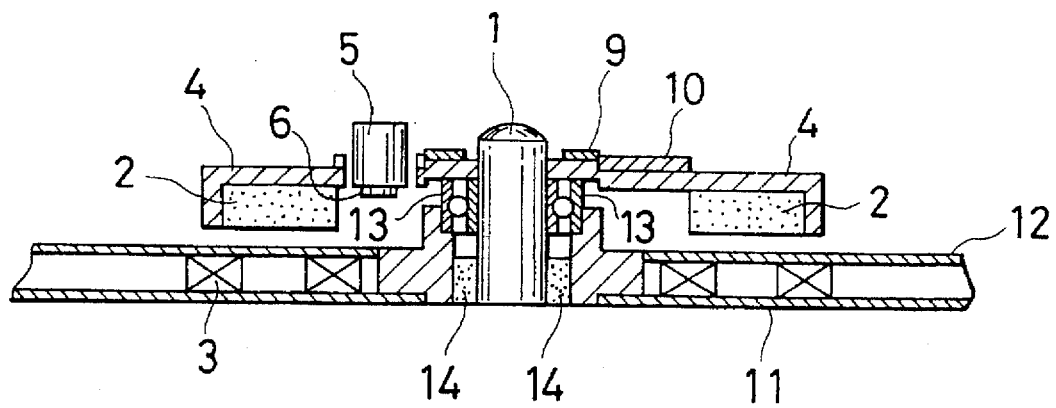
FIG. 3B is a vertical cross-sectional view of the disk mounting device of FIG. 3A.
Figure 4:
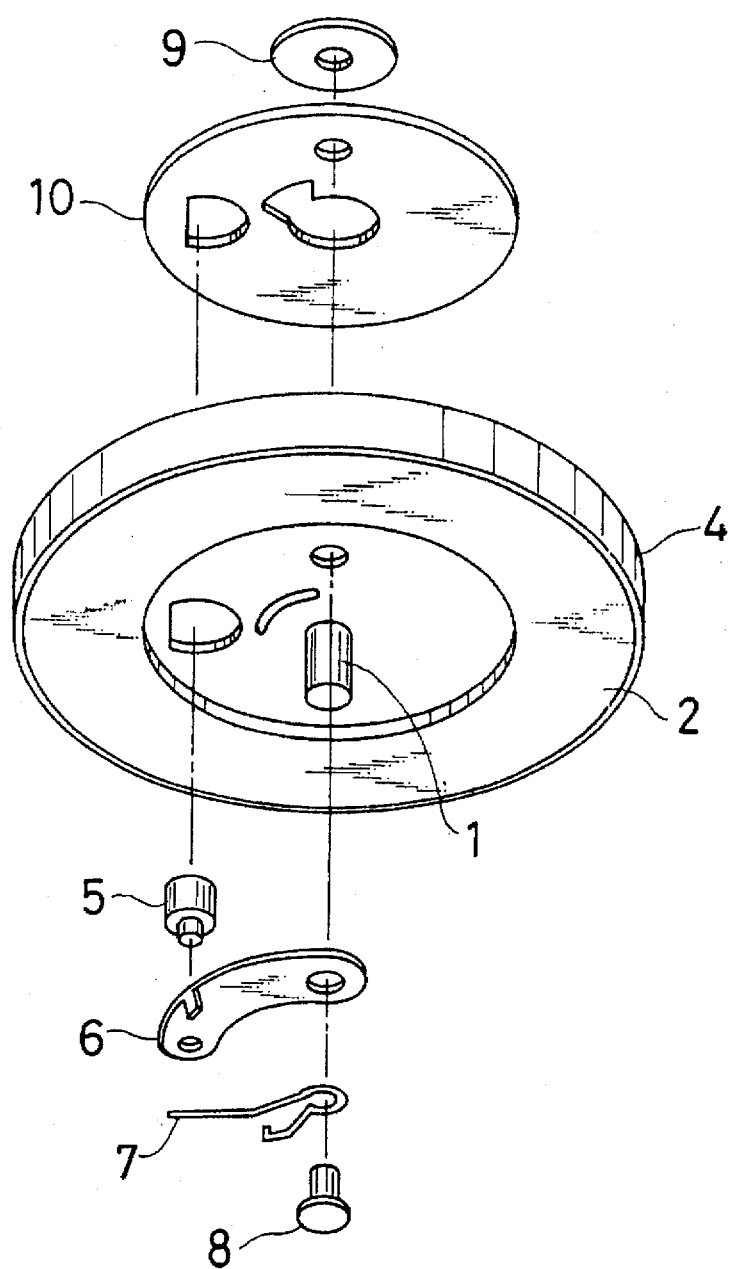
FIG. 4 is an exploded perspective view of a rotor portion of the disk mounting device of FIG. 3A.

FIG. 3A is a plan view of a disk mounting device in accordance with the present invention, and FIG. 3B is a vertical cross-sectional view of this disk mounting device. FIG. 4 is an exploded perspective view of a rotor portion of this disk mounting device. In FIG. 1 and FIGS. 3A, 3B and 4, the same reference numerals denote the same or corresponding parts, respectively, and therefore explanation of such parts in this embodiment is omitted here. In FIG. 4, reference numeral 7 denotes a positioning spring, and reference numeral 8 denotes a pin held in position by deformation.

In FIGS. 3A, 3B and 4, a spindle or shaft 1 is rotated together with a rotor yoke 4 by an electromagnetic system constituted by a magnet 2 and a coil 3, the rotor yoke 4 being press-fitted on the spindle 1. The rotor yoke 4 includes chucking members, such as a drive pin 5, a drive pin arm 6 and other members, and a Teflon tape 9 to promote sliding of an information carrier, and in particular a floppy disk. An attracting magnet 10 for mounting the floppy disk is affixed directly to the upper surface of the rotor yoke 4. With this construction, the disk (recording medium) can be placed on the upper surface of the rotor yoke 4.

Figure 1:
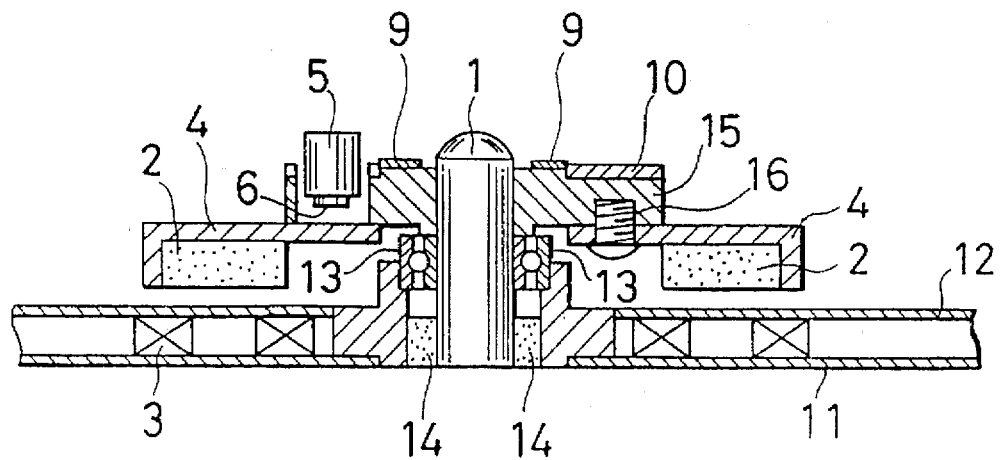
FIG. 1 is a schematic, vertical cross-sectional view of a conventional disk mounting device.

In the above construction, the separate chucking flange 15, used in the prior art device of FIG. 1 so as to serve as a yoke for the attracting magnet 10, does not need to be provided, and therefore the number of parts is reduced, and the overall thickness of the device can be reduced.

Further, since the rotor yoke 4 also serves as a yoke for the attracting magnet 10, the problem of leakage flux can be dealt with.

Figure 5:
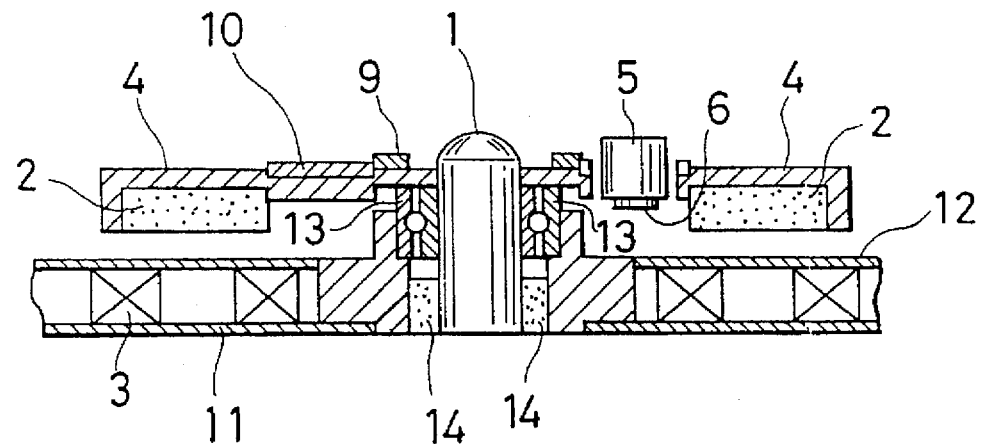
FIG. 5 is a view similar to FIG. 3B, but showing a modification of the disk mounting device of the invention.

FIG. 5 shows a modification of the disk mounting device of the invention. In FIGS. 1, 3A, 3B and 5, the same reference numerals denote the same or corresponding parts, respectively, and therefore explanation of such parts in this embodiment is omitted here.

In FIG. 5, the attracting magnet 10 is partially embedded in a rotor yoke 4, and therefore the disk mounting device of this embodiment is of thinner construction than the disk mounting device shown in FIGS. 3A and 3B. When an extremely thin motor is desired, a portion of the rotor yoke is subjected to half-blanking or drawing, and the attracting magnet 10 is received in and directly secured to this portion. Therefore, the thickness of the motor is reduced by this amount, and similar effects as achieved by the embodiment of FIGS. 3A and 3B can also be attained.

In the present invention, if the attracting magnet is made of a flexible or soft material such as a rubber-type material, it can conform in configuration to the rotor yoke, and even if the attracting magnet is thin, it will not suffer from the problem of warping.

FIG. 6 is a front-elevational view, partially in section, of a magnetic disk drive unit of the present invention incorporating a disk mounting device of the present invention. In FIGS. 2 and 6, the same reference numerals denote the same or corresponding parts, respectively, and therefore explanation of such parts is omitted here.

In this embodiment, the flange 29 shown in FIG. 2 is omitted, and a rotor 52 also performs the function of a flange. More specifically, a shorter shaft 51 is used instead of the shaft 28, and the rotor 52 is fixedly mounted on the upper portion of the shaft 51. The rotor 52 is disk-shaped and is stepped or raised at its central portion.

A slide washer 53 is mounted on the raised central portion of the rotor 52 to promote sliding of the floppy disk. An attracting magnet 54 in the form of a sheet-like rubber magnet is mounted on the lowered portion of the rotor 52.

A drive magnet 55 is secured to the lower surface of the rotor 52 adjacent to the outer periphery of the rotor 52. A printed circuit board 56 is disposed adjacent to the drive magnet 55 in opposed relation thereto. A drive coil 57 is mounted on the lower surface of the printed circuit board 56. The drive magnet 55 can comprise a neodymium-type magnet, having the maximum magnetic force among magnets of rare earth elements, in which case a high torque can be produced with a rotor of the small diameter. The printed circuit board 56 comprises a glass epoxy board having a thickness of 0.3 to 0.4 mm, and an FG (function generator) pattern is formed on the upper surface of the printed circuit board 56. The drive coil 57 is bonded to the lower surface of the printed circuit board 56, and is connected to a lead pattern on the printed circuit board 56. A motor drive circuit (not shown) for supplying electric current to the drive coil 57 in a predetermined energizing mode to drive the same is provided on that surface of the printed circuit board 56 to which the drive coil 57 is bonded.

A stator 58 is disposed below the drive coil 57 and is fixedly mounted on the bottom surface of a chassis 21, and an insulating washer 61 is interposed between the drive coil 57 and the stator 58. The central portion of the stator 58 serves as a base supporting a motor housing 59. The stator 58 is disposed in a notched portion of the bottom wall of the chassis 21 in order to reduce the height of the DD motor. Upper and lower bearings 60a and 60b are mounted at the central portion of the motor housing 59, and rotatably support the shaft 51.

The rotor 52 serves as a back yoke in a magnetic circuit provided by the above construction, and the magnetic flux passes through the stator 58 and the drive coil 57 to this back yoke.

The operation of the magnetic disk drive unit of FIG. 6, from the loading of the floppy disk to its chucking, is similar to that described above for the prior art magnetic disk drive unit of FIG. 2, and its explanation is omitted to avoid a repetition.

When electric current flows through the drive coil 57, a magnetomotive force produced by the drive coil 57 is applied to the drive magnet 55, and a rotational torque is exerted on the drive magnet 55 due to a repulsive force and an attractive force produced between the drive coil 57 and the drive magnet 55. As a result, the rotor 52 is rotated, and in response to this rotation, the shaft 51 and a drive pin 31 rotate, thereby rotating the loaded floppy disk.

In the construction of FIG. 6, the stator 58 and part of the drive coil 57 are disposed at the level or height of the bottom wall of the chassis 21, and the rotor 52 also serves as the flange. Therefore, the overall height of the DD motor can be reduced. Further, by reducing the diameter of the rotor, head carriages 23a and 23b can be disposed adjacent to the side of the DD motor, and therefore the height of the magnetic disk drive unit can be reduced.

While the present invention has been specifically described with reference to the above preferred embodiments, the invention itself is not to be restricted to such embodiments, and various modifications can be made without departing from the spirits of the invention.

What is claimed is:

1. A disk mounting device for a disk drive unit which writes information on and/or reads information from a disk having a recording medium, comprising:

(a) a disk drive motor means, arranged on a chassis of said disk mounting device, for providing a rotational force to rotate said disk, said disk drive motor means including a rotatable drive shaft and a rotor yoke which is fixed to said drive shaft and which rotates with said drive shaft, said rotor yoke having a top surface which receives said disk and having a bottom surface, said disk drive motor means additionally including a drive magnet which is arranged at an outer peripheral portion of said bottom surface of said rotor yoke to generate said rotational force of said disk drive motor means, said disk drive motor means having a stator yoke which is disposed in a concave portion of said chassis, said concave portion encompassing a thickness of said stator yoke by a depth of said concave portion;

(b) an attracting magnet means for magnetically holding said disk on said rotor yoke, said attracting magnet means being mounted directly on said top surface of said rotor yoke; and (c) chucking means for transmitting rotation of said disk drive motor means to said disk, said chucking means being arranged at an inner portion defined between said drive magnet and said drive shaft, and disposed in a plane defined by an upper surface of said drive magnet, said chucking means including a drive pin and a drive pin arm which is movably supported at the inner portion on the bottom surface of said rotor yoke and which mounts said drive pin for movement with respect to said top and bottom surfaces of said rotor yoke, said drive pin being engageable with said disk received on said top surface of said rotor yoke.

2. A disk mounting device as claimed in claim 1, wherein said attracting magnet means comprises a magnet made of a flexible rubber-type material.

3. A disk mounting device as claimed in claim 2, wherein said disk drive motor means comprises a direct drive spindle motor which includes a rotor portion and a stator portion, said rotor portion having said rotor yoke and a drive magnet and said stator portion having an electromagnetic coil.

4. A disk mounting device as claimed in claim 1, wherein said disk drive motor means comprises a direct drive spindle motor which includes a rotor portion and a stator portion, said rotor portion having said rotor yoke and said drive magnet and said stator portion having an electromagnetic coil.

5. A disk mounting device as claimed in claim 1, further comprising a tape of polytetrafluoroethylene disposed at an inner peripheral portion of said attracting magnet means.

6. A disk mounting device as claimed in claim 1, wherein said rotor yoke has an opening and said attracting magnet means has an opening, said openings being aligned and said drive pin extending through said openings, and wherein said disk has a center hub with a central opening for receiving said drive shaft and an eccentric opening for receiving said drive pin.

7. A disk mounting device as claimed in claim 1, wherein said rotor yoke has a recess in which at least part of said attracting magnet means is embedded.

8. A disk mounting device as claimed in claim 1, wherein said attracting magnet means is annular and is disposed on said rotor yoke so as to be coaxial with said drive shaft.

9. A disk mounting device as claimed in claim 1, wherein said drive pin arm connects said drive pin to said drive shaft.

10. A drive unit having a head for writing information on and/or reading information from an information carrier having a recording medium, comprising:

(a) a drive means, arranged on a chassis of said drive unit, for providing a rotational force to rotate said information carrier, said drive means including a drive shaft and a rotor yoke having a top surface which receives said information carrier and having a bottom surface, said drive means additionally including a drive magnet which is arranged at an outer peripheral portion of said bottom surface of said rotor yoke to generate said rotational force of said drive means, said drive means having a stator yoke which is disposed in a concave portion of said chassis, said concave portion encompassing a thickness of said stator yoke by a depth of said concave portion;

(b) an attracting magnet means for magnetically holding said information carrier, said attracting magnet means being mounted directly on said top surface of said rotor yoke; and (c) chucking means for transmitting rotation of said drive means to said information carrier, said chucking means being arranged at an inner portion defined between said drive magnet and said drive shaft and disposed in a plane defined by an upper surface of said drive magnet, said chucking means including a drive pin and a drive pin arm which is movably supported at the inner portion on the bottom surface of said rotor yoke and which mounts said drive pin for movement with respect to said top and bottom surfaces of said rotor yoke, said drive pin being engageable with said information carrier received on said top surface of said rotor yoke.

11. A drive unit as claimed in claim 10, wherein said drive means comprises a drive motor, said drive shaft, said rotor yoke and said drive magnet forming part of said drive motor, wherein said rotor yoke is fixedly connected to said drive shaft, and wherein said drive pin arm connects said drive pin to said drive shaft.

12. A drive unit as claimed in claim 10, wherein said drive means comprises a drive motor having a stator portion and a rotor portion, said rotor yoke and said drive magnet forming part of said rotor portion, said chassis of said drive unit having a wall which lies in a plane, said wall having said concave portion in which said stator yoke of said drive motor is disposed, said head being disposed at a distance from said plane that is approximately the same as the distance between the rotor portion of said drive motor and said plane, said head additionally being disposed so that a line perpendicular to said plane and passing through said head does not also pass through said rotor yoke.

13. A drive unit as claimed in claim 10, wherein said information carrier is disk-shaped, and wherein said drive means includes a drive motor for rotating said disk-shaped information carrier, said rotor yoke and said drive magnet forming part of said drive motor.

14. A drive unit as claimed in claim 13, wherein said rotor yoke is directly mounted on said drive shaft of said drive motor.

15. A drive unit as claimed in claim 13, wherein said information carrier has a center hub which is engaged by said drive pin to drive said information carrier for rotation.

16. A drive unit as claimed in claim 15, wherein said attracting magnet means has a slot through which said drive pin projects from said rotor yoke to engage said center hub of said information carrier.

17. A magnetic disk drive unit having a magnetic head for writing information on and/or reading information from a disk having a magnetic recording medium, comprising:

(a) a disk mounting device which includes (i) a disk drive motor means for rotating said disk, said disk drive motor means having a drive shaft and being in the form of a direct drive spindle motor which includes a rotor portion and a stator portion, said rotor portion having a rotor yoke and a drive magnet and said stator portion having an electromagnetic coil and a stator yoke, said rotor yoke having a top surface which receives said disk and having a bottom surface, said drive magnet being arranged at an outer peripheral portion of said bottom surface of said rotor yoke; and (ii) an attracting magnet means for magnetically holding said disk, said attracting magnet means being mounted directly on said top surface of said rotor yoke;

(b) a chassis on which said disk mounting device is fixedly mounted, said chassis having a wall which lies in a plane, part of said wall being removed to provide a concave portion in which said stator yoke of said stator portion is disposed, said concave portion encompassing a thickness of said stator yoke by a depth of said concave portion, said magnetic head being disposed at a distance from said plane that is approximately the same as the distance between said rotor portion and said plane, said magnetic head additionally being disposed so that a line perpendicular to said plane and passing through said magnetic head does not also pass through said rotor yoke; and (c) chucking means for transmitting rotation of said disk drive motor means to said disk, said chucking means being arranged at an inner portion defined between said drive magnet and said drive shaft and disposed in a plane defined by an upper surface of said drive magnet, said chucking means including a drive pin and a drive pin arm which is movably supported at the inner portion on the bottom surface of said rotor yoke and which mounts said drive pin for movement with respect to said top and bottom surfaces of said rotor yoke, said drive pin being engageable with said disk received on said top surface of said rotor yoke.

18. A magnetic disk drive unit as claimed in claim 17, wherein said attracting magnet means comprises a magnet made of a flexible rubber-type material.

19. A magnetic disk drive unit as claimed in claim 18, wherein said drive magnet of said rotor portion comprises a magnet made of a rare earth element.

20. A magnetic disk drive unit as claimed in claim 18, wherein said direct drive spindle motor further includes a bearing rotatably supporting said drive shaft, said bearing being supported by said stator portion, said rotor portion being disposed above said stator portion, and said rotor portion being mounted directly on said drive shaft.

21. A magnetic disk drive unit as claimed in claim 17, wherein said drive shaft extends through said rotor yoke, wherein said disk has a center hub with an eccentric opening, wherein said drive pin is engageable with said eccentric opening, and wherein said drive pin arm connects said drive pin to said drive shaft.

22. A magnetic disk drive unit as claimed in claim 17, wherein said drive magnet of said rotor portion comprises a magnet made of a rare earth element.

23. A magnetic disk drive unit as claimed in claim 17, wherein said direct drive spindle motor further includes a bearing rotatably supporting said drive shaft, said bearing being supported by said stator portion, said rotor portion being disposed above said stator portion, and said rotor portion being mounted directly on said drive shaft.

* * * * *